US009921645B2

(12) United States Patent
Theytaz et al.

(10) Patent No.: US 9,921,645 B2
(45) Date of Patent: Mar. 20, 2018

(54) RETINAL PROJECTION DEVICE AND METHOD FOR ACTIVATING A DISPLAY OF A RETINAL PROJECTION DEVICE

(71) Applicant: Logitech Europe S.A., Lausanne (CH)

(72) Inventors: Olivier Theytaz, Savigny (CH); Christophe Constantin, Cossonay-Ville (CH); Arash Salarian, Dubendorf (CH); Maxim Vlassov, Geneva (CH); Daniel Bonanno, Geneva (CH)

(73) Assignee: Logitech Europe S.A., Lausanne (CH)

( * ) Notice: Subject to any disclaimer, the term of this patent is extended or adjusted under 35 U.S.C. 154(b) by 14 days.

(21) Appl. No.: 14/753,984

(22) Filed: Jun. 29, 2015

(65) Prior Publication Data
US 2016/0378180 A1 Dec. 29, 2016

(51) Int. Cl.
*G06F 3/033* (2013.01)
*G02B 27/01* (2006.01)
*G06F 3/01* (2006.01)
*G02B 26/08* (2006.01)
*G06K 9/00* (2006.01)
*G06K 9/46* (2006.01)
*G06K 9/48* (2006.01)
*G06K 9/62* (2006.01)

(52) U.S. Cl.
CPC ......... *G06F 3/013* (2013.01); *G02B 26/0833* (2013.01); *G02B 27/0172* (2013.01); *G06F 3/012* (2013.01); *G06K 9/0061* (2013.01); *G06K 9/00617* (2013.01); *G02B 2027/0178* (2013.01); *G02B 2027/0187* (2013.01); *G06K 9/00604* (2013.01); *G06K 9/00671* (2013.01); *G06K 9/4647* (2013.01); *G06K 9/48* (2013.01); *G06K 9/6247* (2013.01)

(58) Field of Classification Search
CPC ........ G02B 27/01; G02B 27/00; G02B 27/30; G02B 26/10; G02C 11/00; G06F 3/033; G09G 5/08
See application file for complete search history.

(56) References Cited

U.S. PATENT DOCUMENTS 5,251,333 A 10/1993 Tsook
5,481,622 A * 1/1996 Gerhardt ................ A61B 3/113
345/158

(Continued)

FOREIGN PATENT DOCUMENTS

EP 0344881 B1 12/1989
EP 1394592 A1 3/2004

OTHER PUBLICATIONS

U.S. Appl. No. 14/495,282, naming Olivier Theytaz, filed Sep. 24, 2014.

(Continued)

*Primary Examiner* — Pegeman Karimi
(74) *Attorney, Agent, or Firm* — Kilpatrick Townsend & Stockton LLP (57) ABSTRACT

The present disclosure is directed to retinal display projection device comprising a projection component arranged for projecting an image directly onto the retina of a user wearing the device. The projection device further comprises an eye gaze detection module arranged to take an eye image of a user's eyes and to activate the projection component if a pupil of the user is in a predetermined position in said eye image.

23 Claims, 8 Drawing Sheets

(56) References Cited

U.S. PATENT DOCUMENTS

| | | | |
|---|---|---|---|
| 5,585,871 | A | 12/1996 | Linden |
| 5,764,203 | A | 6/1998 | Holmlund et al. |
| 6,431,705 | B1 | 8/2002 | Linden |
| 7,677,723 | B2 | 3/2010 | Howell et al. |
| 9,500,868 | B2* | 11/2016 | Dopilka .............. G02B 27/0172 |
| 2001/0011968 | A1 | 8/2001 | Tidwell |
| 2001/0043208 | A1 | 11/2001 | Furness et al. |
| 2001/0043402 | A1 | 11/2001 | Melville et al. |
| 2002/0085175 | A1 | 7/2002 | Butler et al. |
| 2002/0097498 | A1 | 7/2002 | Melville et al. |
| 2002/0175880 | A1 | 11/2002 | Melville et al. |
| 2004/0174599 | A1 | 9/2004 | Dietrich |
| 2005/0119642 | A1* | 6/2005 | Grecu .................... A61B 3/113 606/5 |
| 2006/0139374 | A1 | 6/2006 | Ritter et al. |
| 2007/0052672 | A1 | 3/2007 | Ritter et al. |
| 2009/0086165 | A1* | 4/2009 | Beymer ............. G06K 9/00604 351/210 |
| 2009/0122385 | A1 | 5/2009 | Hilton |
| 2009/0190094 | A1 | 7/2009 | Watanabe et al. |
| 2011/0102874 | A1 | 5/2011 | Sugiyama |
| 2012/0105310 | A1 | 5/2012 | Sverdrup et al. |
| 2012/0157114 | A1* | 6/2012 | Alameh ................. H04M 1/605 455/456.1 |
| 2012/0293773 | A1* | 11/2012 | Publicover ............. A61B 3/113 351/210 |
| 2014/0043320 | A1 | 2/2014 | Tosaya et al. |
| 2015/0085333 | A1 | 3/2015 | Theytaz |
| 2015/0199009 | A1* | 7/2015 | Raffle .................... G02B 27/00 345/156 |
| 2015/0378162 | A1* | 12/2015 | Bailey .................... G02B 27/30 345/8 |
| 2016/0026847 | A1* | 1/2016 | Vugdelija ............ G06K 9/6218 382/103 |
| 2016/0073945 | A1* | 3/2016 | Fine ..................... A61B 5/4064 600/558 |
| 2016/0262608 | A1* | 9/2016 | Krueger ............... A61B 3/0041 |

OTHER PUBLICATIONS

Butow et al. "Quick Reference for the Google Glass Touchpad," book content sample, http://www.dummies.com/how-to/content/quick-reference-for-the-google-glass-touchpad.html, (Apr. 2014), 2 pages.

Tweney "Bet you didn't know you needed a remote control for Google Glass," http://venturebeat.com/2013/08/05/bet-you-didnt-koow-you-needed-a-remote-control-for-google-glass/, (Aug. 5, 2013), 4 pages.

"Sensors on Google Glass," http://thecodeartist.blogspot/2013/05/sensors-on-google-glass.html, (May 2013), 2 pages.

Saenz "Augmented Reality On Your Glasses, Maps in Your Eyes," http://Singularityhub.com/2010/10/24/Aug,emted-reality-on-your-glasses-maps-in-you-eyes-video/,(Oct. 24, 2010), 3 pages.

Non-Final Office Action dated Feb. 1, 2016 for U.S. Appl. No. 14/495,282, filed Sep. 24, 2014, 10 pages.

Final Office Action dated May 18, 2016 for U.S. Appl. No. 14/495,282, filed Sep. 24, 2014, 10 pages.

Advisory Action dated Aug. 10, 2016 for U.S. Appl. No. 14/495,282, filed Sep. 24, 2014, 4 pages.

Non-Final Office Action dated Dec. 20, 2016 for U.S. Appl. No. 14/495,282, filed Sep. 24, 2014, 11 pages.

Notice of Allowance dated May 11, 2017 for U.S. Appl. No. 14/495,282, filed Sep. 24, 2014, 5 pages.

Notice of Allowance dated Aug. 9, 2017, for U.S. Appl. No. 14/495,282, filed Sep. 24, 2014, 5 pages.

* cited by examiner

RETINAL PROJECTION DEVICE AND METHOD FOR ACTIVATING A DISPLAY OF A RETINAL PROJECTION DEVICE

CROSS-REFERENCES TO RELATED APPLICATIONS

This application is related to U.S. application Ser. No. 14/495,282, entitled "Retinal Display Projection Device," filed Sep. 24, 2014.

TECHNICAL FIELD

The present application relates to a retinal projection device. More specifically, the present invention relates to the activation of a display of a retinal projection device.

BACKGROUND OF THE INVENTION

Sport activities such as jogging, biking, diving etc. are often practiced with a device that display sport related data, such as heart pulse, speed, pace, calories burnt, and so on. These sport-related data can be displayed with a head-mounted display, for example glasses. In particular, sport data can be displayed with a retinal projection device.

Retinal projection devices are known as such. They usually comprise a light source and a MEMS-based mirror arranged for orienting the laser beam directly onto a selected portion of the retina of the user wearing the device. By scanning the laser beam and controlling its intensity, the device projects an image that is superimposed over the image of the scene viewed by the user.

Conventional retinal displays are usually conceived so as to replace a large portion of user's field of view by a projected image. In this case, the user does not see the scene behind the projected area, which is unacceptable for many sport applications where the sportsman needs a largely unobstructed field of view.

Retinal displays that display a large transparent image overlaid over the real scene are also known. In this case, the user is able to see simultaneously the scene of the real word with an image or some objects superimposed over this view. This is also very distracting for most sport activities where the sportsman needs to concentrate most of the time exclusively on the real scene, and only occasionally wants to see data related to his sport activity.

Displaying a large image with a retinal display requires fast moving mirrors and fast transmission rates for transmitting large image frames. This results in a high power consumption, and in voluminous batteries that frequently needs to be replaced or recharged.

Most retinal display systems moreover require dedicated glasses. Those glasses are usually not well suited for sport activities. Different sports require different type of glasses. For example, large glasses with optimal sun and fog protection are often used for skiing, while jogging is preferably made with lighter sun glasses. Users who need medical glasses have difficulties in using conventional retinal display systems.

Some of these retinal display systems project an image which has fixed optical characteristics such as brightness, luminance, contrast, etc., thus resulting in difficulties for the user when looking at the image in different ambient conditions.

In addition to the above, it is worth pointing out that if the display of the retinal projection device is always active during the usage of the retinal projection device itself (the usage of the glasses), this can lead to high power consume of the batteries of the glasses and can be disturbing for the user, producing unnecessary exposure or fatigue for him.

The user focus is on the sport activity, in particular for demanding ones such as interval training for a runner, while prompting of relevant information are needed punctually or by the user request. Outside of these triggers, the display should remain off, to enhance the user focus on the activity (no distraction), as well as his comfort of vision (no disturbing glowing display light). On the other hand, when valuable activity-related data are needed by the user, these should be obtained rapidly, in an easy (natural) and hassle-free (non distracting) way.

Accordingly, there is a need to turn on and off the projector display on demand in a rapid, natural, non-distracting way, thus also improving the safety of the user himself as unwanted distraction could lead to injuries.

There is also a need to adapt automatically and dynamically the luminance of the projected image as a function of the ambient light conditions which can vary greatly during glasses usage. The goal is to firstly increase the user comfort of vision by optimizing luminance and secondly to efficiently manage the light source and therefore optimize the system power consumption.

In addition there is a need to save current consumption of the battery powered glasses when the displayed information is not needed. The extension of time between two charges, i.e. the autonomy of the glasses, is a key requirement and feature of such glasses. One indeed needs at least to be able to finish a several hours sport exercise or competition without running out of batteries (e.g. a marathon is 3 . . . 5 hours).

BRIEF SUMMARY OF THE INVENTION

Embodiments of the present invention relate to a new wearable retinal projection device better adapted to sport activities and to a method for activating it.

In one aspect, the present disclosure is directed to retinal display projection device comprising a projection component arranged for projecting an image directly onto the retina of a user wearing the device. The projection device further comprises an eye gaze detection module arranged to take an eye image of a user's eyes and to activate the projection component if a pupil of the user is in a predetermined position in said eye image.

In one embodiment, the movement of a user's eye to the side, or up or down, turns the display on and off. This allows hands-free activation of the device, eliminating the need for the user to try to activate a switch while running, biking, etc. The position of a user's head or the average position of the user's gaze over time can be tracked so that if a user's gaze is normally in a non-centered position (such as up when the user is bent over bicycle handles), the gaze movement required can be calibrated from that non-centered position. In another aspect, the display itself is provided at an off-center position, with the display only being provided when the user moves his/her gaze, and the projection system being turned off when the user returns to a normal gaze. This conserves battery power and allows for a lightweight device that can be mounted on sports glasses.

In another embodiment, a main display is only provided when a user's pupil is in a desired position (e.g., to one side), but a secondary display is provided in the user's normal field a vision (e.g., and intermittent display of "look right for metrics").

In another aspect, the eye gaze detection module comprises an image sensor and a plurality of lens.

In another embodiment of the present invention, the disclosure relates to a method for activating a projection component of a retinal display projection device comprising the steps of acquiring an eye image having a plurality of pixels, detecting, within said eye image, a plurality of eye's anatomical landmarks, determining if the plurality of eye landmarks correspond to an eye with a pupil placed in a predetermined position and activating the projection component if the pupil is placed in the predetermined position.

In another aspect, the predetermined position is in a predefined region of a reference system (x, y) of the eye, wherein the reference system (x,y) has an x-axis passing through the center of a Caruncle of the eye and a lateral canthus and a y-axis perpendicular to the x-axis and crossing it at the middle point of a line segment connecting the center of the Caruncle and the lateral canthus.

In another aspect, the method further comprises, after the acquisition of the eye image, the step of normalizing the histogram distribution of intensity values of the eye image pixels.

In another aspect, the step of normalizing comprises the steps of representing the lightest sections of the eye image by pixel values near to a maximum value and the darkest sections of the eye image by pixel values near to zero.

In another aspect, the step of detecting a plurality of eye's anatomical landmarks comprises detecting connected regions of the eye image, converting the eye image to a binary mask thus assigning to each pixel of the image a predefined value based on the intensity value of said pixel and finding all connected regions whose pixels have the same predefined value.

In another aspect, the method further comprises applying morphological transformations to the connected regions to remove noise or very small features.

In another aspect, the connected regions whose pixels have the same predefined value are classified using a classifier to detect if each one of them corresponds to an anatomical landmarks of the eye.

In another aspect, the method comprises the steps of acquiring an eye image, performing a principal component analysis of the image, decomposing the pixel values of the whole eye image into a set of linearly uncorrelated values or the principal components, applying a gaze classifier to the principal components to detect if the eye image shows an eye with the pupil placed in a predetermined position, activating the projection component if the pupil is placed in said predetermined position.

In another aspect, the method comprises the step of performing a zero phase component analysis of said image.

In another aspect, the method comprises using a gaze classifier based on random forests (RF).

In another aspect, the method uses a neural network.

In another aspect, the method uses a support vector machine.

In another aspect, the retinal projection display includes an ambient light sensor arranged to adapt the brightness of the projected image and the activation of the projection component comprises the step of adapting the light intensity of the projected image according to the following equation:

$$I_{lightsource} = I_{user} * I_{pixel} * a * \ln(I_{ALS}) + B$$

where $I_{lightsource}$ is the drive current of a light source (20) of the projection component (2)

$I_{user}$ is a predefined scaling factor;

$I_{pixel}$ is the pixel intensity characterizing the image to be displayed;

$\ln(I_{ALS})$ is a predefined scaling factor dependent emission current ($I_{ALS}$) of the ambient light sensor (32);

a and B are predefined values.

BRIEF DESCRIPTION OF THE DRAWINGS

The invention will be better understood with the aid of the description of an embodiment given by way of example and illustrated by the figures, in which.

DETAILED DESCRIPTION OF THE INVENTION

The retinal projection device in one embodiment is a non see-through device.

The normal field of view of the user is the field of view when the user sees in a sensibly horizontal direction with the head in a neutral, straight position. A direction is considered to be sensibly horizontal if it deviates by less than +−15° from the horizontal direction.

Alternatively, the retinal display device is replaced by a micro-display, such as a LCD, OLED or LED display, mounted onto glasses outside of the normal field of view of said user.

Since the image is projected outside of the normal field of view of the user, the user has to change his gazing direction in order to view the projected image.

Alternatively, the user has to move the micro-projection component in order to view the image. The micro-projection component can be mounted on a movable arm.

This has the advantage that the image displayed by the retinal display device is not permanently visible; the user has to move his sight in order to see it. Thus, the retinal display image is less distracting and less obstructive.

In one embodiment, the device is arranged for projecting a light beam which is only visible when the user orientates his gaze in an unusual direction, for example upward or downward. Thus, the displayed image is substantially invisible when the user watches in a more horizontal direction. This embodiment will be disclosed in more details here below.

In one embodiment, the device is arranged for projecting an image which is focused when the user focuses his eye at a predetermined distance, for example at a predetermined distance between 0.5 and 5 meters, preferably between 2 and 3 meters. Thus, the image is less visible or distracting when the user focuses at a different distance, for example when he focuses at infinity which is common in many sport activities.

In one embodiment, the micro-projection component is arranged for projecting an image of a size equivalent to a rectangle with side lengths comprised between 20 and 50 cm at a distance comprised between 1.5 and 5 meters. Thus, the size of the displayed image is limited, which is less distracting and frees a larger part of the users' field of view. This size is nevertheless sufficient for displaying sport relevant data, such as for example heart rate, speed, pace, etc.

In one embodiment, the movable light source can comprise one MEMS-based mirror movable in two independent directions for scanning the display area.

The micro-projection component can comprise two mirrors independently movable in different directions for scanning the display area.

In one embodiment, a new wearable projection device with reduced power consumption is provided. The use of VCSELs components as laser source allows for a very low consumption, very small volume, and low cost. Various manufacturers produce VCSELs components emitting in visible light.

Instead, a micro LED, for example a pinhole, can also be used.

The use of more than one laser source allows for projection of color images by mixing sources with different colors, such as red, green and blue.

In one embodiment, a single laser source is used for displaying a monochrome image, allowing a higher contrast and a lower consumption and volume.

The second lens can be arranged for focusing said light beam onto said retina when the eye is focused at a distance comprised between 0.5 and 4 meters.

In one embodiment, the device has no movable mirror, but instead one movable laser source. This reduces the number of components.

The device can comprise mounting means for removably mounting it on existing glasses. Thus, it could be adapted to various glasses for different sports and different users' tastes or size heads.

The device can also be non-removable and for example integrated in the glasses.

The mounting means can comprise a hook-and-loop fastener. Hook-and-loop fasteners are supplied by the company Velcro among others. This allows easy adapting to glasses of various shape or size.

The mounting means can comprise an elastically deformable clip element.

The mounting means can be arranged for removably mounting at least one component of the device onto one branch of said glasses.

The mounting means can be arranged for removably or permanently mounting at least one component of the device onto a glass of said glasses.

The mounting means can comprise a permanent or re-adherable adhesive.

The mounting means can be arranged for removably mounting the device onto the frame of said glasses.

The light beam emitted by the micro-projection component of the device can go through the glass of the glasses.

Different components of the device can be permanently or removably mounted onto different parts of existing glasses.

One component can be mounted onto one branch of the glasses. Another component can be mounted on the external surface of one glass.

The different components can be mutually connected by a wire connection.

The device can comprise one remote control for controlling the type of information that is displayed. For example, the remote control can be used for selecting among different indications to display, for example between heart rate/speed/power/pace/ and so on.

The remote control can also be used to activate the display for displaying the information.

A plurality of indications can be displayed at the same time. The remote control can be used to select among various sets of indications, each set comprising one or more indications.

The remote control can be connected to the device over a wireless connection.

The remote control can be an integral part of the sport equipment, or removably mounted onto an existing sport equipment.

In one embodiment, the remote control is actionable with the thumb.

In one embodiment, the remote control is worn as a ring, for example on the forefinger.

The remote control can comprise a roller actionable with the thumb or with a finger.

The remote control can comprise one button actionable with the thumb or with a finger.

The remote control can comprise one roller actionable with the finger for selecting an indication, and one button actionable with one finger to confirm the selection.

The roller can be combined with a push button in order to confirm a selection by pushing the roller.

The remote control can comprise one button to wake up the device from a sleep mode.

The activation of the button on the remote control can trigger the projection device.

In one embodiment the projection device is in sleep mode until activated by the button (or activated by eye gaze as below disclosed in detail).

The roller can allow a user to pre-select a given pre-programmed type of information. This last is being displayed (i.e. beamed) for a defined duration (typically 5 seconds) only when the user press the button.

If the micro-projector is placed on a motorized arm, the button activation may position the projection device in the user direct field of view (i.e. horizontal).

The device can comprise at least one micro-projector arranged for being mounted in the field of view of said user, and one radio-frequency receiver arranged for being mounted outside the field of view of said user when said glasses are worn, said micro-projector and said receiver being mutually connected over a wire connection.

The retinal display projection device 1 (glasses) illustrated in FIGS. 1 to 4 comprises a micro-projection component 2, a control component 3 and an optional remote control 5. The micro-projection component 2 and the control component 3 are mounted onto existing glasses 1, or could be integral with dedicated glasses or goggles. The micro-projection component 2 can be connected with the control component 3 over a wire connection 7. Alternatively, those two components 2, 3 can be integrated into one single part. Alternately, a wireless connection can be used.

The device 2,3,5 can comprise or be connected with other devices including sensors 4*a* and/or processing means 4*b* for generating other indications. For example, the device can be wirelessly connected with a wristwatch, mobile phone, satellite based navigation system, heart rate sensor, accelerometer, pedometer, computer, running sensor, etc., that produce additional indications that can be displayed with the retinal display projection device.

The processing means 4b of the glasses are arranged to receive and elaborate, in a manner per se known, all the data coming from all the components of the glasses 1 (for example the projection component 2, the control component 3, the sensors 4a, the remote control 5 etc.)

The remote control 5 can be mounted onto different sport equipment, for example on a ski or walking pole, on a bicycle handlebar, or on a scuba or diving equipment. It could also be integral with one such dedicated sport equipment. Alternatively, it could be worn on a finger, for example as a ring on the forefinger. The remote control comprises haptic means 50, such as at least one roller and/or at least or one button or a tactile surface, that can be manipulated with the user's thumb or fingers for entering command, such as indication selection commands and indication confirmation commands, that are wirelessly transmitted to a receiver 31 as part of the control component 3. The wireless connection can be based for example on a Bluetooth, Ant, Zigbee or proprietary protocol. The remote control can comprise a battery. Alternatively, the remote control is powered by an energy harvesting system, for example using a microgenerator for producing power from movements of the remote control.

The projection component 2 can be triggered selectively as this control might come on demand from the user or it can be triggered automatically by the processing means of the glasses 1 based on a threshold (for example, every kilometer, every predefined time interval or when the heart beat rate exceeds a threshold). The on/off state of the projection component 2 does not mean the on/off state of the glasses 1: when the projection component 2 is switched off, other functions of the glasses 1 may continue to work in the usual manner.

The micro-projection component 2 can be permanently, removably or re-adhesively mounted onto existing glasses or goggles. In the illustrated embodiment, the micro-projection component 2 is directly mounted, for example using a permanent or re-adherable adhesive, onto the external surface of one glass of the glasses 1. Alternatively, the micro-projection component 2 can be mounted onto the external surface of one glass, or on a branch/arm 10 of the glasses, or on the frame 11, using fixing means such as hook-and-loop fasteners, or clip means. The user can preferably adapt the position of the micro-projection component 2 according to his viewing preferences.

In another embodiment (not illustrated), the micro-projection component 2 is motorized and/and or mounted onto an arm or articulation for displacing it relative to the glasses 1, and bringing it into the user's field of main view (sensibly horizontal), or removing it from the user's field of view. The micro-projection component 2 can in this case comprise or be mounted onto the distal end of a rotatable arm. The other end of the arm is fixed relative to the glasses and can be mounted for example on the branch 10 or frame 11 of the glasses.

Figure 2:
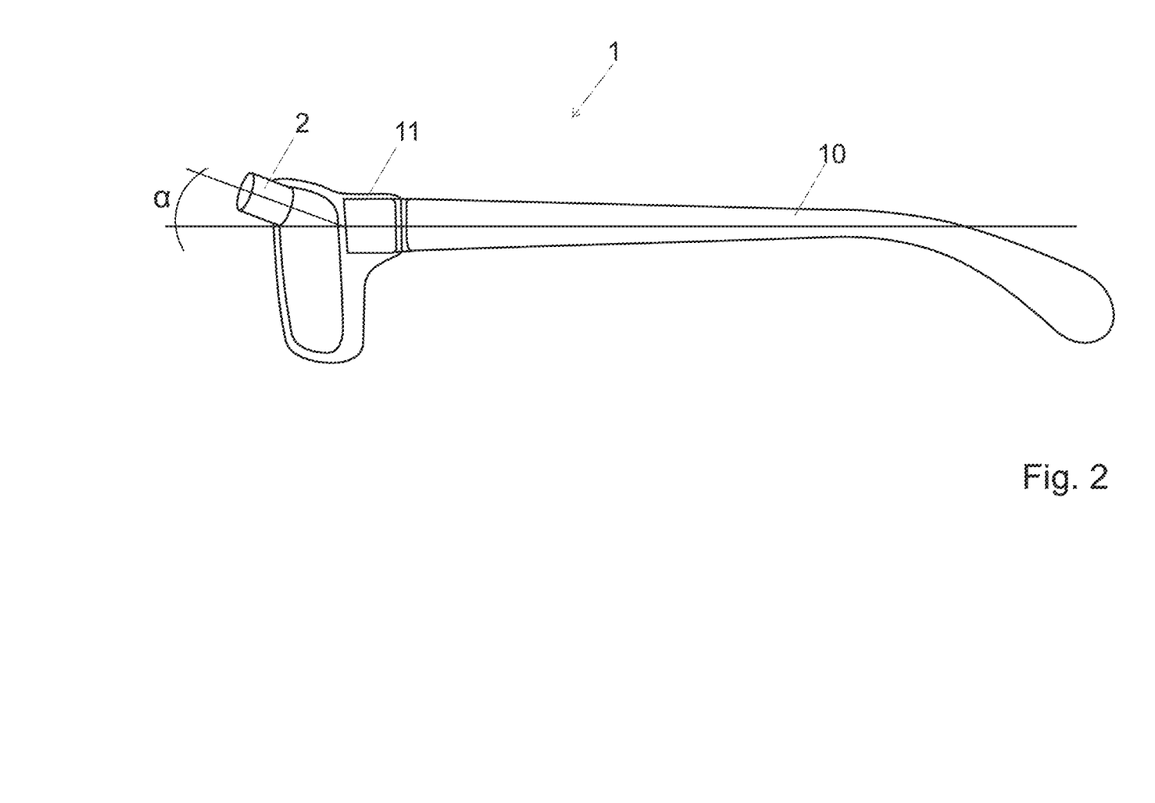
FIG. 2 shows a side view of the projection component of the device of FIG. 1.

As can be seen in particular on FIG. 2, the micro-projection component 2 is preferably mounted onto, directly against or at short distance from the external surface of a glass of the glasses.

The micro-projection device 2 is preferably mounted above or below the line of sight of the user when the user watches in a horizontal direction with the head in a neutral, straight position. The micro-projection device 2 is preferably mounted so that the middle direction of the beam light that it emits is not horizontal when the glasses 1 are horizontal, so as to create an angle α between the middle sending direction and the horizontal gazing direction. In this way, the image projected by the micro-projection component is most of the time unnoticeable by the user, unless when he moves his gazing direction upwards (or possibly downwards) toward the component 2. The angle α is advantageously comprised between 15° and 25°. This angle corresponds to the comfortable eye upward looking direction without creating strains w/r to 0° which is the horizontal sight view (for head in normal vertical position) and also corresponds to the micro-projection device 2 angle, or the micro-projection exiting beam direction thanks to a wedge or equivalent.

The angle α can preferably be adjusted by the user and/or automatically.

Figure 3:
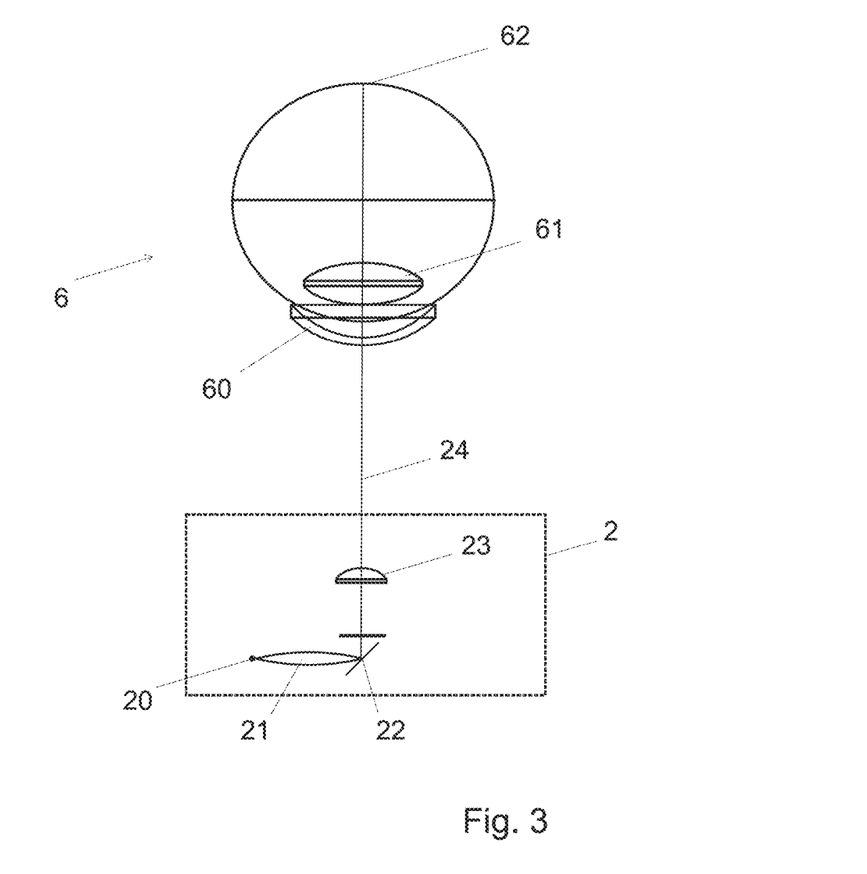
FIG. 3 shows a schematic view of the elements of the projection component of FIG. 2.

FIG. 3 illustrates various elements of one embodiment of the micro-projection component 2 and of the user's eye 6. The micro-projection component 2 comprises one light source 20 for generating a monochromatic image, or three laser sources with different wavelengths for generating a color image by mixing the three light beams. The light source 20 can be a VCSEL laser that emits visible light, a LED, such as a pinhole LED, or any other suitable light source.

A focusing lens 21 in front of the laser source 20 focuses the light and projects it onto a mirror 22 that can oscillate around two orthogonal axes. Alternatively, two mirrors each alternating around one single axis could be used. In yet another embodiment, the micro-projection component 2 comprises one movable laser source 20 that replaces one or both mirrors. The mirrors and/or the laser source are oscillated so as to scan a preferably rectangular image. The brightness of each pixel is controlled by varying the intensity of light emitted by each laser source at each instant of time.

The light source 20 can be placed on the same substrate as the MEMS with the mirrors, or in a different substrate. Deflecting elements might be provided between the light source 20 and the movable mirrors. Other embodiments could be considered.

The light deflected by the mirror(s) is collimated by a collimating lens 23 and directed onto the retina 62 of the user's eye 6, by passing through the cornea 60 and eye lens 61. Therefore, an image is projected by the projection component 2 directly onto the retina 62. The distance to the lens 23 can preferably be adjusted to accommodate for user's vision and/or glass thickness.

The micro-projection system 2 can comprise at least one additional light source for emitting at least one light beam that can indicate additional information, such as for example training zones. The additional light beam(s) preferably reaches the user's eye without being reflected by the mirror 22. The additional light source can comprise a light ring around the lens 23. The additional light source can comprise one or a plurality of LEDs, for example multicolor LEDs. In another embodiment the additional light source could be diffused on the mirror and superimposed on the microprojected main light.

The color of the additional light source might be different than the color of the main light source.

The micro-projection system 2 can comprise a vibration reduction system, for example vibration reduction system based on an electrodynamic or piezoelectric system, for compensating vibrations. The anti-vibration system can be controlled by an inertial sensor.

Figure 4:
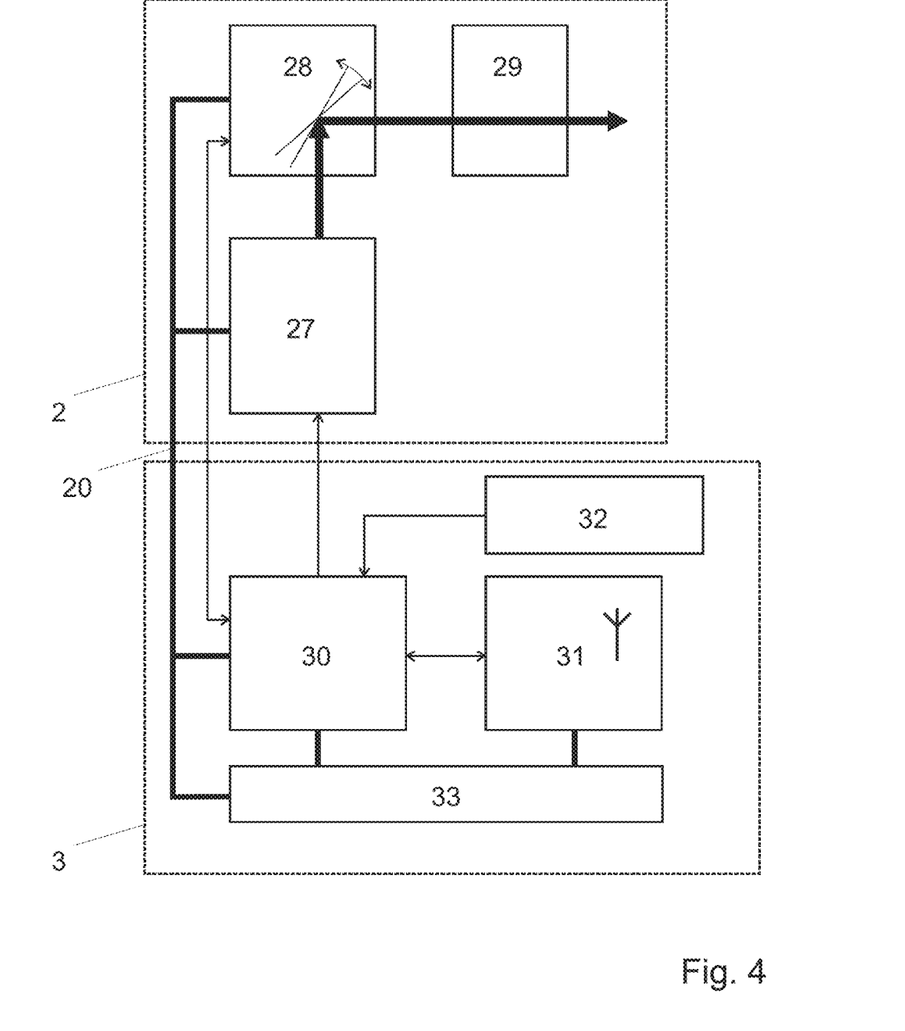
FIG. 4 shows a block diagram of the projection component and the control component of the device of FIG. 1.

FIG. 4 illustrates a possible block-schema of the device 2, 3. The micro-projection component 2 comprises at least one laser source 27 with its driving circuit, one or two movable scanning mirrors and some optical components 29, such as lenses 21, 23. The mirrors 28 and possible the laser source and/or the driving elements can be integrated as one MEMS component. Those elements are preferably packaged into one waterproof housing with a window for the emitted light. The power supply is preferably provided by the control component 3 over the cable 20. The micro-projection component 2 can comprise mounting means for mounting it on, directly against or through, or in front of the external glass of glasses, so that the middle direction of the light beam projected by the component will go through the glass.

In one embodiment the projection component 2 could be integrated into the glasses frame. The glass might have some clear aperture or cut to accommodate the size of the projection component 2.

The control component 3 comprises in this example a power supply element 33 with a battery, such as a lithium-polymer battery, and power management circuit. The battery can also be external to the component 3, for example within the frame or branch or the glasses.

The control component 3 can comprise a connector, such as for example a micro USB or proprietary connector, for re-chargeability and firmware update and data upload/download (e.g. various displays linked to roller selection). This can also be done wirelessly.

The element 30 is a microcontroller for controlling the laser and driver 27 and the other components. The element 31 is a radio-frequency transceiver, such as a Bluetooth, ANT, Zigbee or proprietary module, for communicating with a remote control and/or with external sensors as mentioned.

The control component 3 can also comprise sensors, such as an ambient light sensor 32 for measuring the current illumination level and adapt the brightness of the displayed image accordingly and/or in function of user preferences or selections. Preferably, the ambient light sensor is part of the micro-projection component 2.

Alternatively, the processing means 4b are included in the control component 3.

The control component 3 can comprise or be connected with an inertial sensor, for example an accelerometer and/or gyroscope with one or a plurality of axes. The inertial sensor can be used for detecting movements or vibration of the glasses and for controlling an anti-vibration system (not shown) for reducing the adverse effects of vibrations of the micro-projection component on the quality and comfort of the projection.

The control component 3 can comprise a piezoelectric element for generating an audible vibration as a signal, for example when the user exceeds a predetermined speed or heart rate. This piezoelectric element may be a buzzer. The audible sound can be either an air wave sound or a bone conducted vibration that creates as well sound in the ear. The piezoelectric element may then warns the user and may temporarily replace the need of the remote control 5 to trigger information or provide directions.

The control component 3 can comprise or be connected with electrodes for measuring the heart rate.

The device 2, 3 can also comprise a gaze sensor (disclosed in detail here below) for detecting the users' gazing direction. The gazing direction can be used for entering command, for example for selecting indications to display by gazing at a corresponding icon or selection area. The gazing direction can also be used to activate the projection component 2 on demand, as detailed here below.

The device 2, 3 can also comprise a head inclination sensor for detecting the head inclination, as disclosed here below in greater detail. Head movements can be also used for selecting or confirming commands.

Returning now to the activation of the projection component 2 to display a retinal image, this can be obtained using a system of gaze-detection of the user's direction of view.

Determining continuously the direction of eye gaze is per se known because it has been proposed in various fields such as human-computer interaction (in compliment or in place of computer mouse, touchpads, . . . ) or behavioral marketing (what is attracting for people in a shopping mall). These known systems are based on optical imaging: a camera is filming the eye, often illuminated with an additional IR light source, while heavy signal processing is often managed by a computer, live or offline.

In summary, an eye gaze detection system or module according to an embodiment of the present invention is a miniaturized device placed close to an eye and light-weight as embarked on glasses 1 and worn in public. It reliably functions outdoor with very large variations of ambient light (10 . . . 50000 lux) and sun reflections (direct or indirect). It is power efficient as powered by on board batteries and it uses simple signal processing schemes as calculations are done by the processing means of glasses instead of by a computer. The accuracy in determining the eye gaze direction is relatively modest, at about +/−2°, when the purpose is display on-off control.

Figure 1:
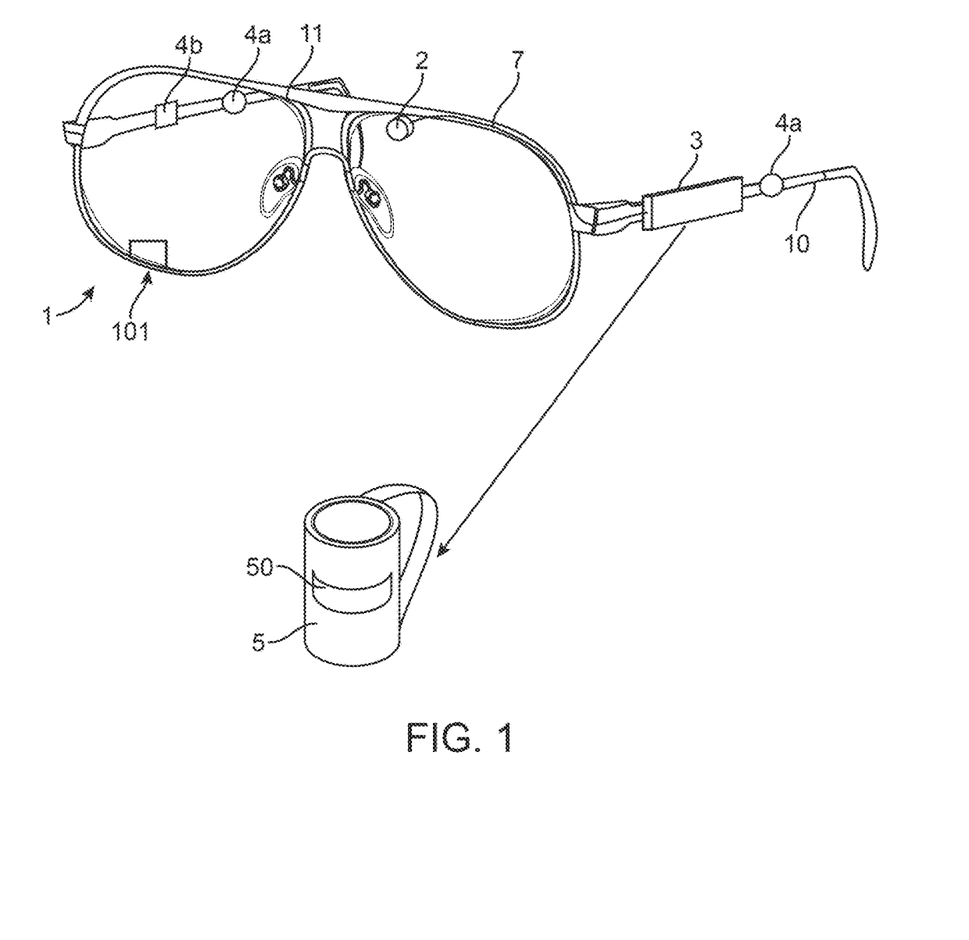
FIG. 1 shows a perspective view of a retinal projection device according to one embodiment of the invention.

FIG. 1 already disclosed shows also a PCB module 101 representing the eye gaze detection system, attached on the front portion of the frame 11. Alternatively, the PCB module 101 can be placed on one arm 10 using additional optics such as mirrors and prisms to form the image of an eye on the eye gaze sensor.

The eye gaze detection module 101 consists in a set of optimized components with specific geometry taking a video sequence of the user's eye movements (eye images). An image processing method here below disclosed determines if the projection component 2 should be activated or not in real time.

The eye gaze detection module 101 includes:
 1) a low size (preferably ⅛"), low resolution (preferably 320×240 pix), digital CMOS image sensor, for example the image sensor model S2SAP/S from SNAP Sensor SA;
 2) an in-house designed short focal, low magnification imaging lens (preferably focus=1 mm and magnification=0.06);
 3) a standard IR lamp (light source).

Preferably, the processing means 4b (standard micro-controller unit) are also included in the eye gaze detection module 101.

Alternatively, the eye gaze detection module does not comprise the light source.

The above components are assembled in a manner per se known on the PCB module 101.

The eye gaze module 101 could be a stand-alone module pointing on the same or different eye with respect to the projector component 2 but alternatively the two devices can be merged together sharing some optical elements.

Figure 5A:
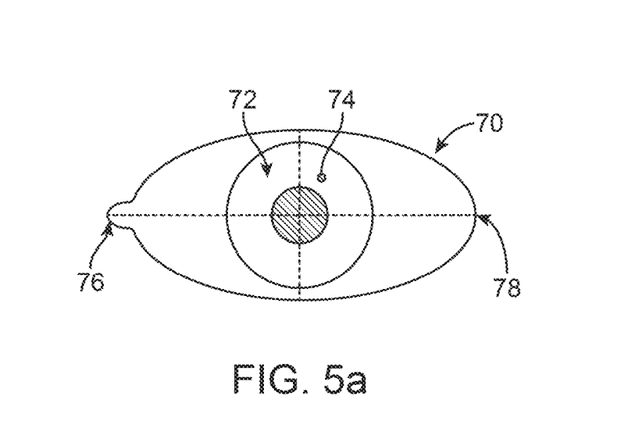
FIGS. 5a and 5b show a simplified eye used by a method for analyzing the eye images according to the present invention.
Figure 5B:
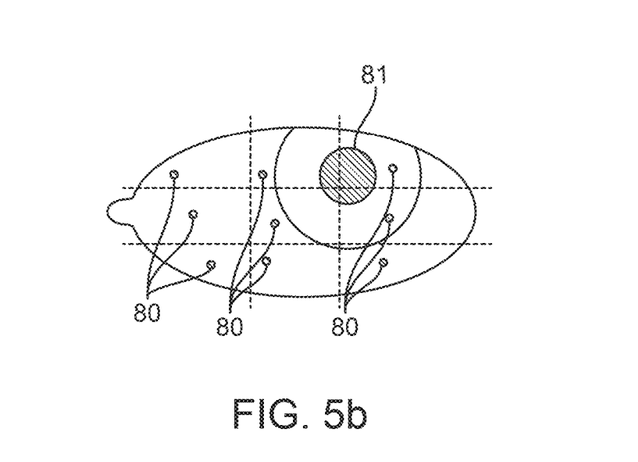

In one embodiment of the present invention the eye images captured by the CMOS camera are analyzed independently. In one embodiment of the present invention, the image processing method used for analyzing the eye images is based on the idea of detecting the eye's anatomical landmarks. FIG. 5a shows a simplified picture of an eye 70 whose landmarks include a pupil 72, an iris 74, a Caruncle 76 and the lateral canthus 78. The eye area is divided into nine regions 80. FIG. 5b shows the same eye 70 whose pupil 72 is placed in the upper-right region at a position 81.

Figure 6:
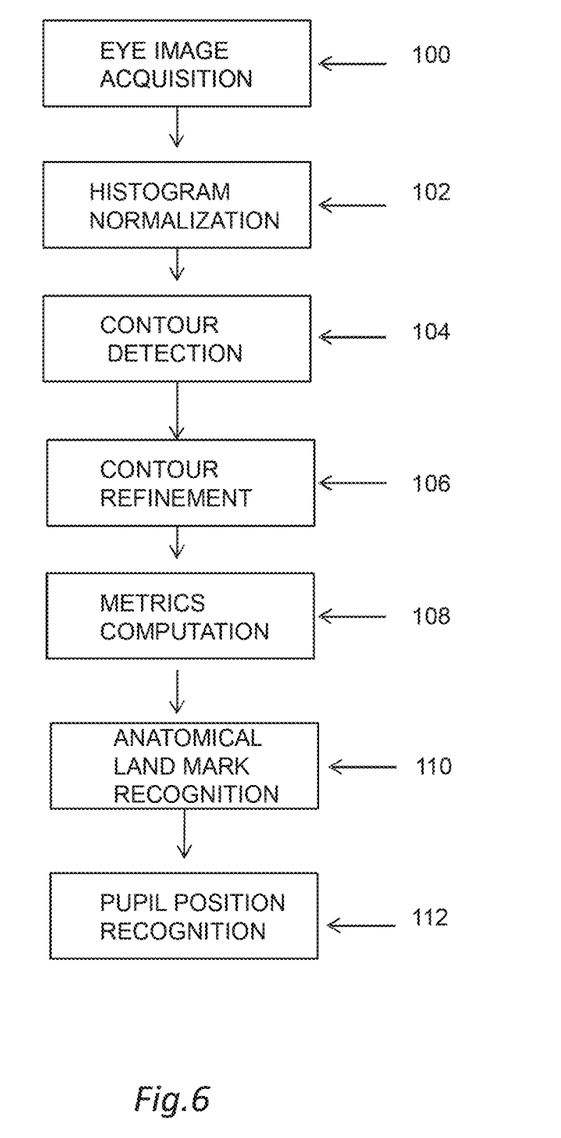
FIG. 6 is a flow chart of a method for elaborating an eye image for activating a display of the device of FIG. 1 according to the present invention.

With reference to FIG. 6, the steps of a method for elaborating an eye image in order to activate the projection component 2 according to the present invention will be disclosed in detail. The following steps are used to detect the pupil and the other landmarks.

In a first step 100, an eye image of an eye of the user is acquired by the CMOS image sensor. At step 102 the histogram of the distribution of light intensities of the image's pixels is normalized (histogram equalization). As a result, the lightest sections of the eye image are represented by pixel values near the maximum and the darkest sections of the eye image are represented by pixel values near zero. In one embodiment of the invention, the pixel values are represented by numeric values between 0 and 255 (one byte). In another embodiment of the invention the pixel values are represented by numerical values between 0 and 65535 (two bytes).

Then at step 104 a contour detection algorithm detects connected regions of the eye image that consists of pixels with values are very close to each other. Firstly, the eye image is converted to a binary mask using a predefined threshold (e.g. 5 in pixel values in range of 0 to 255): in this process every pixel whose intensity value is above the threshold is assigned the value of 1 and every pixel whose intensity value is below the threshold is assigned the value 0. Then, the contour detector finds all connected, preferably dark regions, of the image (i.e value 0 of the binary mask) by comparing each mask value to its neighbors.

Subsequently, at step 106 all detected connected regions of step 104 are further refined using morphological transformations to remove noise or very small features, e.g. sand and pepper noise or single pixel wide features extending out of a connected region. To decide which, if any, of the refined contours corresponds to the eye's anatomical landmarks, at step 108 a set of metrics are computed for each contour, thus obtaining a feature extraction. These metrics include the average pixel value of the contour, the area of the contour, the area of the bounding box of the contour, the ratio of the area to the bounding box area, the radius of a circle fitted on the contour, the center of the bounding box of the contour, the center of the mass of the contour, the distance of the center of the bounding box of the contour to the center of mass of the contour, etc.

Subsequently, at step 110 a set of per se known classifiers use the computed metrics for each connected region to detect if each one of them corresponds to any of the anatomical landmarks of the eye. Step 110 is therefore a contour classification. The classifiers are pre-trained using a database of hand-labeled images of eye where each landmark is tagged. The database include images of eyes under various lighting conditions, skin tones, iris colors as well as small variations of relative position of the camera to the eye. Preferably, these classifiers are based on classification trees. Alternatively, the classifiers are based on the logistic regression.

Finally, at step 112, another classifier per se known is used to determine if the ensemble of the eye landmarks detected at step 110 corresponds to an eye with pupil 72 placed in a predetermined position, preferably in the upper right region 80, or not (i.e. the pupil is in a different region 80). Therefore, at step 112, a gaze classification is performed. The classifier at step 112 uses the relative position of the landmarks and is based on classification trees or alternatively based on logistic regression. This classifier as well is pre-trained based on a database of hand-labeled images.

The objective of the steps above disclosed is to detect if the pupil 72 is in a predetermined region 80, preferably the upper right (or left) region of the eye 70: a reference system x, y, of the eye 70 is defined (see FIG. 6), whose x-axis passes through the center of the Caruncle 76 and the lateral canthus 78 and the y-axis is an axis perpendicular to the x-axis and crossing it at the middle point of the line segment connecting the center of the Caruncle 76 and the lateral canthus 78.

Figure 7:
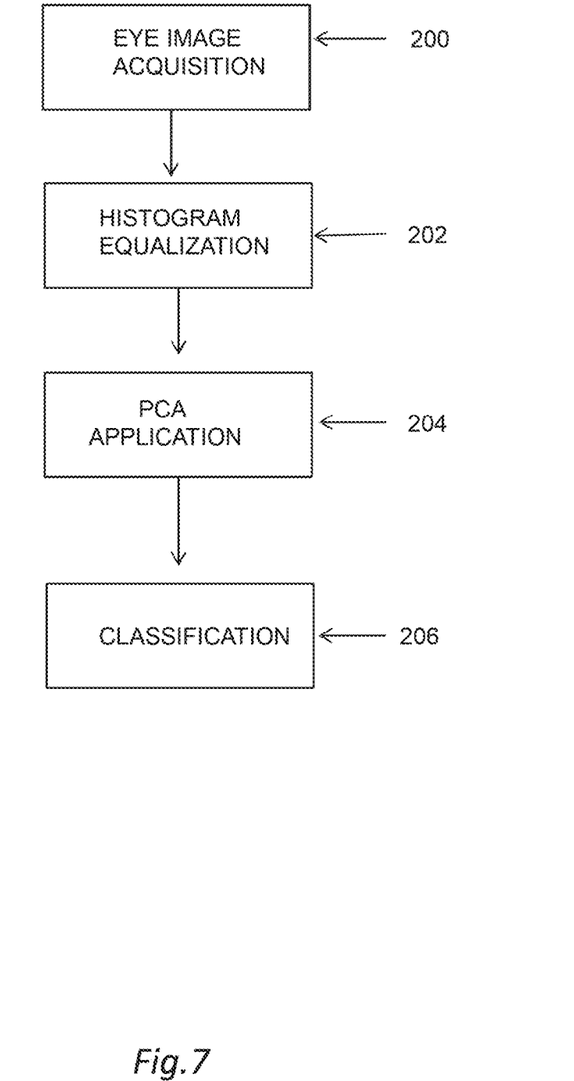
FIG. 7 is a flow chart of an alternative method for elaborating an eye image for activating a display of the device of FIG. 1 according to the present invention.

In another embodiment of the invention, the gaze detection is based on different process whose steps are those shown in FIG. 7. At step 200 an image of the eye is captured. At step 202 histogram equalization is used to flatten the distribution of the pixel values. This step is identical to the step 102 of FIG. 6.

Subsequently, at step 204 a principal components analysis (PCA) of the image is performed, and the pixel values of the whole eye image are decomposed into a set of linearly uncorrelated values (called the principal components). As a result of this step, the first principal component reflects the highest variance of the information in the image. The second, third and all other subsequent principal components will reflect smaller and smaller portion of the variance of the information in the image. An alternative embodiment of the invention could use the ZCA (Zero or Zero phase Component Analysis) instead of PCA.

In step 206 a gaze classifier based on random forests (RF) uses the principal components obtained at step 204 to detect if the eye image shows an eye with the pupil 72 in a predetermined position, preferably in the upper right region, or not. Alternative embodiments of the invention could be based on neural networks or Support Vector Machines (SVM).

The gaze classifier based on random forests (RF) is pre-trained using a database of hand-labeled images of eye. The database include images of eyes under various lighting conditions, skin tones, iris colors as well as small variations of relative position of the camera to the eye.

The eye gaze module 101, after having completed the steps above disclosed (either the ones referring to FIG. 6 or the ones referring to FIG. 7), sends, if the pupil is in said predetermined position, an activation signal to the processing means 4b which in turn activate, in a manner per known, the projection component 2. The eye gaze module 101 communicates with the processing means 4b by serial interface, providing an "on" or "off" status data, based on the periodic outcome of above DSP.

The main advantage of the user looking in the direction of the display to turn it on is that this is the most natural way to activate it as it does not necessitate any additional event such as hand movement or voice order. The benefit of reduced power consumption has been discussed and is clear. An additional benefit of having the eye gaze module 101 is to extend its functionality beyond the mere activation of the projection component 2. For instance, considering that the display is projecting sequential screens with different information, the user could scroll from one screen to the next one by means of eye gazing down. The performance of the full system should then be increased, in particular in the accuracy of the eye gaze direction calculation, to sub-degree levels.

Yet another addition benefit could be the dimming of the display brightness in function of ambient light conditions, using the mean brightness of the CMOS camera instead of the separate ALS described above. Still another additional benefit could include indications of the runner state of wellness, using the eye gaze camera to characterize if the eye is closed, blinking often, saccadic eye movement, or any other abnormal behavior of the eye.

In terms of technology, the use of the special logarithmic camera above cited that allows to obtain an extremely wide dynamic range has several benefits over other eye gaze sensor. All ambient light conditions, from as low as 10 lux (dawn, sunset) to as high as several kLux (bright mid daylight), could be addressed without adjusting the gain control of the camera, which often complicates image processing. Moreover, additional IR LED shining in the user's eye, as used in most existing eye tracker, would become unnecessary as well, lifting up concerns of constant light in the eye, as well as additional power consumption and cost.

As cited above, the glasses 1 includes also an ambient light sensor 32. It is well known that a photodiode optimized to be sensitive in the visible light range can be used to sense the ambient light level, such that actions like adapting the luminance of a display to an optimum level can be taken. These Ambient Light Sensing photodiodes are widely used in smartphone/tablets applications for instance: they measure the ambient light level and produce a current signal representative of this level.

In the case of sunglasses, it is important to account for the attenuation effect of shading glasses, which in some cases can vary thanks to adaptive tinted glasses or clippable lenses of various tint. In other words, there is a need to characterize the ambient light that the eye is experiencing behind the glasses.

In one embodiment, the location for measuring that ambient light level is within the space between the eye and glassware; the ambient light sensor 32 can be mounted on the glasses frame, sensing either the eye area or the user's field of view (landscape) area. In another embodiment, the ambient light sensor 32 is mounted external to the glassware, but necessarily sensing the eye area in this case. The ambient light sensor 32 can be also part of or mechanically attached to the projection component 2. It can also be separated from it as a stand-alone module in an optimum location on the glasses frame (see above, within the control component 3). In yet another embodiment, two ambient light sensor can be used, one behind the glasses towards the eye and another external to the glasses, such that the glasses transmissivity can be characterized.

Figure 8:
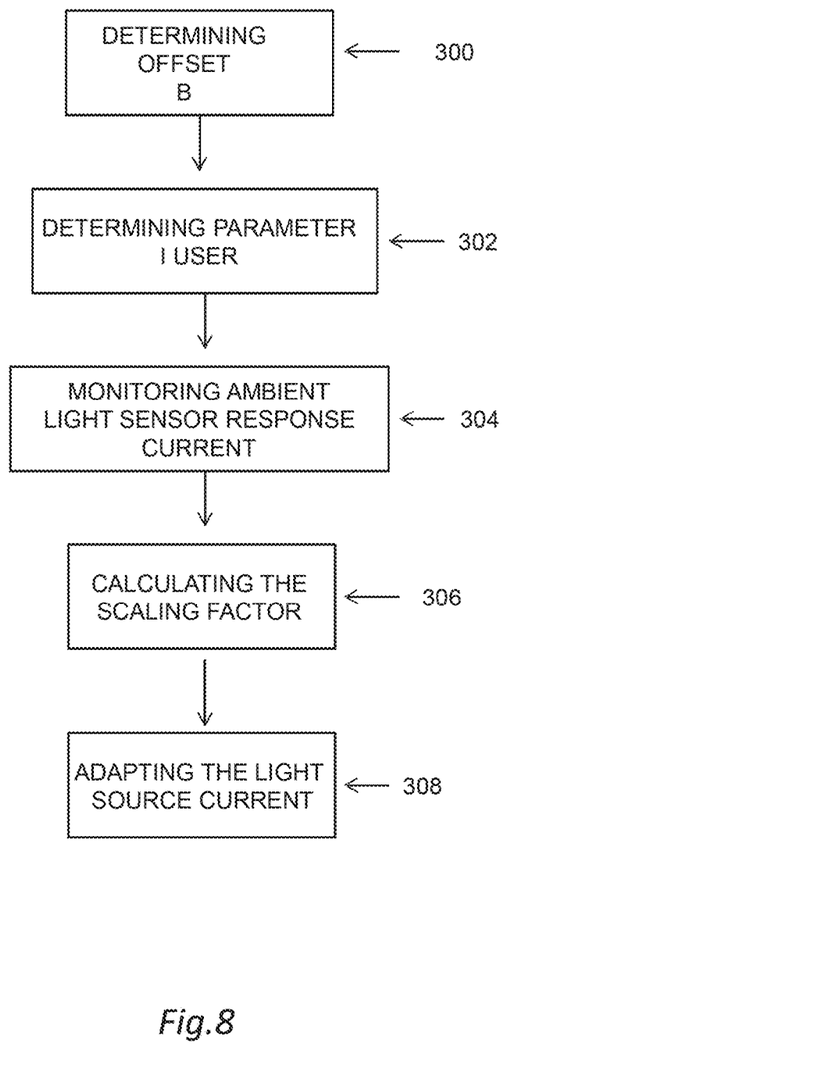
FIG. 8 is a flow chart of a method for adapting the retinal image to the light conditions according to the present invention.

With reference to FIG. 8, the steps of a method for adapting the retinal image to the light conditions (i.e to maintain the display luminance to an optimum level) is described hereafter.

The light source 20 is driven, in a manner per se known, by a drive current $I_{lightsource}$. The drive current $I_{lightsource}$ and hence the intensity of light source 20 is constantly adapted in order to project the desired image onto the retina of the user as per the following formula:

$$I_{lightsource} = I_{user} * I_{pixel} * a * \ln(I_{ALS}) + B, \text{ where}$$

$I_{user}$ is a global scaling factor available to the user through the User Interface (the user can set this value choosing from a group of predefined values)

$I_{pixel}$ is the pixel intensity characterizing the image to be displayed $\ln(I_{ALS})$ is the global scaling factor dependent on the ALS (ambient light sensor 32) current $I_{ALS}$ (the ambient light sensor 32 emits, in a per se known manner, a current $I_{ALS}$ which is proportional to the ambient light level)

a is a human perception factor that is set by design (predefined value)

B is a global offset that can be set by calibration on the production line (predefined value)

At step 300, an offset B is determined and stored for each retina projector component such that when a pixel in the image is off, it appears black: this calibration can for instance be done on the production line and corresponds to set the so-called pixel dark level.

At step 302, the parameter $I_{user}$ is set by the user through a control on the glasses 1, allowing for a customization of the pixel bright level for optimum personal comfort of vision: this step correspond to set s pixel bright level. At step 304, the ambient light sensor 32 response current $I_{ALS}$ is monitored; when the change in this current is larger than a set value, the scaling factor $a*\ln(I_{ALS})$ is computed in step 306. This is indeed a factor that adapts the contrast of the image in view of the changing ambient light conditions; the logarithmic dependence above is due to the well know relationship between the measured luminance and the human perceived response due to the eye receptors, scaled by parameter a, of value close to 10, that is typically determined by user survey during design phase.

Finally in step 308, the light source current is adapted for each pixel, based on the $I_{pixel}$ characterizing the image to be displayed, and based on the factors determined in step 300 to 306, as per the formula above.

Therefore, when the projection component 2 is activated by the eye gaze module 101, the intensity of the light source 20 will be dependent on the drive current $I_{lightsource}$ calculated as above indicated.

Improvement in usability and vision comfort is obvious when displaying an optimum display brightness, therefore avoiding the runner to be neither dazzled, nor hardly deciphering the data displayed. It is to be noted that such display brightness adaptation is well known for smartphones or tablets devices. However, only the screen backlight can be adapted in most of those devices, corresponding to the additive term B in the above formula. The comfort of vision is not optimum as both the displayed information and the background are adapted. In contrast, the algorithm above allows to control the intensity of each pixel individually trough the multiplication term $a*\ln(I_{ALS})$ and therefore to adapt the displayed information only and not the background. Smart reduction of the power consumption is the other advantage in the battery operated glasses.

Various alternative embodiments could be considered by a skilled person within the frame of the invention which is only restricted by the attached claims.

What is claimed is:

1. A retinal display projection device comprising:
   a projection component arranged for projecting an image directly onto the retina of a user wearing the device, by projecting a beam onto the retina of a user and scanning the beam across the user's retina;
   the projection component being mounted outside a normal field of view of the user, such that the user has to change a gazing direction to see the projection component;
   an eye gaze detection module including an image sensor and a processor and arranged to
   obtain and analyze a plurality of eye images of at least one of a user's eyes and
   to activate the projection component if the image analysis shows that a pupil of the user is in a predetermined position in said eye image, wherein the predetermined position is offset by at least 15 degrees from a normal position of the pupil in the eye image, and to automatically deactivate the projection component if the image analysis shows that a pupil of the user is not in the predetermined position in said eye image, such that no image is presented to the user unless the pupil of the user is in said predetermined position in said eye image, and a control for activating and deactivating the projection component by the user.

2. The retinal display projection device according to claim 1, wherein the eye gaze detection module further comprises a plurality of lens.

3. The device of claim 1 wherein the projection component comprises a laser.

4. The device of claim 1 further comprising non-transitory computer readable code, embodied in computer readable media, for controlling the projection component so that a first projected image is only provided when the pupil of the user is in the predetermined position, and the projection component is deactivated when the pupil of the user returns to a normal gaze position.

5. The device of claim 1 wherein the predetermined position is offset by at least 15 degrees from a normal position of the pupil in the eye image.

6. The device of claim 5 wherein the eye gaze detection module & processor is configured to determine a normal position of the pupil of the user, and recalibrate the normal position over time.

7. A retinal display projection device comprising:
a projection component arranged for projecting an image directly onto the retina of a user wearing the device;
an eye gaze detection module including an image sensor and a processor and arranged to
obtain and analyze a plurality of eye images of at least one of a user's eyes and
to activate the projection component if the image analysis shows that a pupil of the user is in a predetermined position in said eye image;
a battery for providing power to the projection component and the eye gaze detection module;
a power management circuit connected to the battery and the projection component;
the processor in the eye gaze detection module being further configured to direct the power management circuit to remove power to the projection module when the pupil of the user is not in the predetermined position.

8. A method for activating a projection component of a retinal display projection device, comprising the steps of:
mounting the projection component outside a normal field of view of the user, such that the user has to change a gazing direction to see the projection component;
acquiring an eye image of a user having a plurality of pixels;
detecting, within said eye image, a plurality of the eye's anatomical landmarks;
determining if said plurality of anatomical landmarks correspond to an eye with a pupil placed in a predetermined position; and
activating the projection component if the pupil is placed in said predetermined position, causing the projection component to project a beam onto the retina of the user and scan the beam across the user's retina, wherein the predetermined position is offset by at least 15 degrees from a normal position of the pupil in the eye image;
automatically deactivating the projection component if the image analysis shows that a pupil of the user is not in the predetermined position in said eye image;
such that no image is presented to the user unless the pupil of the user is in said predetermined position in said eye image; and
activating and deactivating the projection component by the use of a control by the user.

9. The method according to claim 8, wherein said predetermined position is in a predefined region of a reference system (x, y) of the eye, wherein the reference system (x,y) has an x-axis passing through the center of a Caruncle of the eye and a lateral canthus and a y-axis perpendicular to the x-axis and crossing it at the middle point of a line segment connecting the center of the Caruncle and the lateral canthus.

10. The method according to claim 8, further comprising, after the acquisition of the eye image, the step of determining a histogram distribution of intensity values of the eye image pixels and normalizing the histogram distribution.

11. The method according to claim 10, wherein the step of normalizing comprises the steps of representing the lightest sections of the eye image by pixel values near to a maximum value and the darkest sections of the eye image by pixel values near to zero.

12. The method according to claim 8, wherein the step of detecting a plurality of eye's anatomical landmarks comprises the steps of:
detecting connected regions of the eye image;
converting the eye image to a binary mask by assigning to each pixel of the image a predefined value based on the intensity value of said pixel; and
finding all connected regions whose pixels have the same predefined value.

13. The method according to claim 12, further comprising the step of applying morphological transformations to the connected regions to remove noise or very small features.

14. The method according to claim 13, wherein the connected regions whose pixels have the same predefined value are classified using a classifier to detect if each one of them corresponds to an anatomical landmarks of the eye.

15. A method for activating a projection component of a retinal display projection device, comprising the steps of:
mounting the projection component outside a normal field of view of the user, such that the user has to change a gazing direction to see the projection component;
acquiring an eye image;
determining pixel values for the eye image;
performing a component analysis of said eye image;
applying a gaze classifier to the components to detect if the eye image shows an eye with the pupil placed in a predetermined position; and
activating the projection component if the pupil is detected in said predetermined position, based on a threshold, causing the projection component to project a beam onto the retina of the user and scan the beam across the user's retina, wherein the predetermined position is offset by at least 15 degrees from a normal position of the pupil in the eye image;
automatically deactivating the projection component if the image analysis shows that a pupil of the user is not in the predetermined position in said eye image;
such that no image is presented to the user unless the pupil of the user is in said predetermined position in said eye image.

16. The method according to claim 15, wherein the component analysis step is principal component analysis and further includes decomposing the pixel values of the eye image into a set of principal components.

17. The method according to claim 15, wherein the component analysis step c) is a zero phase component analysis of said eye image.

18. The method according to claim 15 wherein the gaze classifier is based on random forests (RF).

19. The method according to claim 15 wherein the gaze classifier is a neural network.

20. The method according to claim 15 wherein the gaze classifier is a support vector machine.

21. A method for activating a projection component of a retinal display projection device, comprising the steps of:
acquiring an eye image having a plurality of pixels;
detecting, within said eye image, a plurality of the eye's anatomical landmarks;
determining if said plurality of anatomical landmarks correspond to an eye with a pupil placed in a predetermined position; and
activating the projection component if the pupil is placed in said predetermined position;
wherein the retinal display projection device includes an ambient light sensor, and further comprising the steps of
adapting the brightness of a projected image; and
wherein activating the projection component comprises the step of adapting the light intensity of the projected image according to the following equation:

$$I_{lightsource} = I_{user} * I_{pixel} * a * \ln(I_{ALS}) + B$$

where
$I_{lightsource}$ is the drive current of a light source (20) of the projection component (2)
$I_{user}$ is a predefined scaling factor;
$I_{pixel}$ is the pixel intensity characterizing the image to be displayed;
$\ln(I_{ALS})$ is a predefined scaling factor dependent emission current ($I_{ALS}$) of the ambient light sensor (32);
a and B are predefined values.

22. A method for activating a projection component of a retinal display projection device, comprising the steps of:
a) acquiring an eye image;
b) determining pixel values for the eye image;
c) performing a component analysis of said eye image;
d) applying a gaze classifier to the components to detect if the eye image shows an eye with the pupil placed in a predetermined position; and
e) activating the projection component if the pupil is detected in said predetermined position;
wherein the retinal display projection device includes an ambient light sensor, and further comprising the steps of
adapting the brightness of a projected image; and
wherein activating the projection component comprises the step of adapting the light intensity of the projected image according to the following equation:

$$I_{lightsource} = I_{user} * I_{pixel} * a * \ln(I_{ALS}) + B$$

where
$I_{lightsource}$ is the drive current of a light source (20) of the projection component (2)
$I_{user}$ is a predefined scaling factor;
$I_{pixel}$ is the pixel intensity characterizing the image to be displayed;
$\ln(I_{ALS})$ is a predefined scaling factor dependent emission current ($I_{ALS}$) of the ambient light sensor (32);
a and B are predefined values.

23. A retinal display projection device comprising:
a projection component arranged for projecting an image directly onto the retina of a user wearing the device, by projecting a beam onto the retina of a user and scanning the beam across the user's retina;
an eye gaze detection module including an image sensor and a processor and arranged to
obtain and analyze a plurality of eye images of at least one of a user's eyes,
to activate the projection component if the image analysis shows that a pupil of the user is in a predetermined position in said eye image, wherein the predetermined position is offset by an angle of at least 15 degrees from a normal position of the pupil in the eye image, wherein the angle is adjustable by the user,
and to automatically deactivate the projection component if the image analysis shows that a pupil of the user is not in the predetermined position in said eye image, such that no image is presented to the user unless the pupil of the user is in said predetermined position in said eye image, and
a control for activating and deactivating the projection component by the user.

* * * * *